United States Patent
Chapman (10) Patent No.: US 11,043,135 B2
(45) Date of Patent: Jun. 22, 2021

(54) SYSTEMS AND METHODS FOR MONITORING LEARNER ENGAGEMENT DURING A LEARNING EVENT

(71) Applicant: Desire2Learn Incorporated, Kitchener (CA)

(72) Inventor: Kenneth Chapman, Kitchener (CA)

(73) Assignee: D2L Corporation, Kitchener (CA)

( * ) Notice: Subject to any disclaimer, the term of this patent is extended or adjusted under 35 U.S.C. 154(b) by 103 days.

(21) Appl. No.: 13/747,363

(22) Filed: Jan. 22, 2013

(65) Prior Publication Data

US 2014/0205984 A1 Jul. 24, 2014

(51) Int. Cl.
*G09B 5/00* (2006.01)
*G09B 7/00* (2006.01)
*G09B 5/14* (2006.01)

(52) U.S. Cl.
CPC .......... *G09B 5/00* (2013.01); *G09B 5/14* (2013.01); *G09B 7/00* (2013.01)

(58) Field of Classification Search
CPC ....................................................... G09B 7/02
USPC ........................................................ 434/308
See application file for complete search history.

(56) References Cited

U.S. PATENT DOCUMENTS

| | | | | |
|---|---|---|---|---|
| 5,195,033 A * | 3/1993 | Samph | ...................... | G09B 7/02 434/323 |
| 5,294,229 A * | 3/1994 | Hartzell | ............... | H04M 11/066 434/322 |
| 5,695,346 A * | 12/1997 | Sekiguchi | .......... | G02B 27/2214 40/436 |
| 5,944,530 A * | 8/1999 | Ho | ........................... | G09B 5/06 434/236 |
| 6,181,910 B1 * | 1/2001 | Jerrold-Jones | ........... | G09B 3/00 434/351 |
| 6,201,948 B1 * | 3/2001 | Cook | ...................... | G09B 5/02 434/350 |
| 6,728,512 B1 * | 4/2004 | Catlin | ..................... | G09B 5/14 434/350 |
| 7,669,056 B2 * | 2/2010 | Frank | ..................... | G06Q 30/02 380/229 |
| 8,754,924 B1 * | 6/2014 | Shane | ................. | H04L 12/1827 348/14.05 |
| 2002/0013836 A1 * | 1/2002 | Friedman | ........... | G06Q 30/0206 709/223 |
| 2004/0078204 A1 * | 4/2004 | Segond | ................. | G10L 15/005 704/277 |

(Continued)

*Primary Examiner* — Xuan M Thai
*Assistant Examiner* — Sadaruz Zaman
(74) *Attorney, Agent, or Firm* — Bereskin & Parr LLP/S.E.N.C.R.L., s.r.l.

(57) ABSTRACT

According to some aspects there is provided a learning system including at least one capture device for monitoring activity of at least one learner and at least one processor configured to: monitor the activity of the at least one learner during a learning event using the at least one capture device to generate learner activity data associated with the at least one learner; generate learner engagement data based upon the learner activity data associated with of the at least one learner, the learner engagement data being indicative of how engaged the learner is during the learning event; generate at least one learner engagement report based upon the learner engagement data; and provide the at least one learner engagement report to a computing device associated with an instructor.

20 Claims, 7 Drawing Sheets

(56) References Cited

U.S. PATENT DOCUMENTS

| | | | |
|---|---|---|---|
| 2005/0221268 A1* | 10/2005 | Chaar | G09B 7/02 434/350 |
| 2006/0093998 A1* | 5/2006 | Vertegaal | G06F 3/011 434/236 |
| 2007/0054245 A1* | 3/2007 | Greenfield | G09B 19/00 434/112 |
| 2007/0196796 A1* | 8/2007 | Strother | G09B 5/00 434/169 |
| 2008/0022211 A1* | 1/2008 | Jones | G09B 5/06 715/739 |
| 2008/0059292 A1* | 3/2008 | Myers | G06Q 10/06 705/7.39 |
| 2008/0227079 A1* | 9/2008 | Boehme | G06Q 10/10 434/322 |
| 2009/0035733 A1* | 2/2009 | Meitar | G09B 7/00 434/118 |
| 2009/0215018 A1* | 8/2009 | Edmondson | G09B 5/14 434/308 |
| 2011/0171620 A1* | 7/2011 | Tzeng | G09B 5/00 434/309 |
| 2011/0262887 A1* | 10/2011 | Cleveland | G09B 5/00 434/247 |
| 2012/0148999 A1* | 6/2012 | Baker | G09B 7/00 434/362 |
| 2012/0244503 A1* | 9/2012 | Neveldine | G09B 19/00 434/236 |
| 2013/0004930 A1* | 1/2013 | Sorenson | G09B 7/02 434/350 |
| 2013/0096892 A1* | 4/2013 | Essa | G06F 17/18 703/2 |
| 2013/0137076 A1* | 5/2013 | Perez | G09B 5/06 434/308 |
| 2013/0260361 A1* | 10/2013 | Mutlu et al. | 434/365 |
| 2013/0330705 A1* | 12/2013 | Grimaud | G09B 5/00 434/365 |
| 2014/0234817 A1* | 8/2014 | Frankfort | G06Q 10/107 434/236 |
| 2015/0099255 A1* | 4/2015 | Aslan | G06Q 50/01 434/350 |
| 2016/0049082 A1* | 2/2016 | Leatherman, III | G09B 5/06 434/408 |

* cited by examiner

SYSTEMS AND METHODS FOR MONITORING LEARNER ENGAGEMENT DURING A LEARNING EVENT

TECHNICAL FIELD

The embodiments herein relate to electronic learning ("eLearning") systems, and in particular to systems and methods for monitoring learner engagement.

INTRODUCTION

Electronic learning (also called e-Learning or eLearning) generally refers to education or learning where users (e.g., learners, instructors, administrative staff) engage in education related activities using computers and other computing devices. For example, learners may enroll or participate in a course or program of study offered by an educational institution (e.g., a college, university or grade school) through a web interface that is accessible over the Internet. Similarly, learners may receive assignments electronically, participate in group work and projects by collaborating online, and be graded based on assignments and examinations that are submitted using an electronic dropbox.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g., studying an electronic textbook, or watching a recorded or live webcast of a lecture) that is not associated with a particular institution or organization.

Electronic learning often occurs without any physical interaction between the users in the educational community. Accordingly, electronic learning overcomes some of the geographic limitations associated with more traditional learning methods, and may eliminate or greatly reduce travel and relocation requirements imposed on users of educational services.

Furthermore, because course materials can be offered and consumed electronically, there are fewer physical restrictions on learning. For example, the number of learners that can be enrolled in a particular course may be practically limitless, as there may be no requirement for physical facilities to house the learners during lectures. Furthermore, learning materials (e.g., handouts, textbooks, and the like) may be provided in electronic formats so that they can be reproduced for a virtually unlimited number of learners. Finally, lectures may be recorded and accessed at varying times (e.g., at different times that are convenient for different users), thus accommodating users with varying schedules, and allowing users to be enrolled in multiple courses that might have a scheduling conflict when offered using traditional techniques.

Despite the effectiveness of electronic learning systems, there are some drawbacks to electronic learning systems. For example, since the educator and the learners are not at the same physical location, it may be challenging for the educator assess how engaged the learners are during a learning activity such as a lecture. For example, an instructor may not be able to monitor whether the learners are paying attention to her lecture since the instructors and the learners are often in different physical locations. Moreover, even if the instructor and the learners are in a same physical location, it may be challenging for the instructor to monitor the engagement of the learners, particularly in large classes where there are a number of learners.

The above information is presented as background information only to assist with an understanding of the present disclosure. No determination has been made, and no assertion is made, as to whether any of the above might be applicable as prior art with regard to the present invention.

SUMMARY

According to some aspects there is provided a learning system including at least one capture device for monitoring activity of at least one learner and at least one processor configured to: monitor the activity of the at least one learner during a learning event using the at least one capture device to generate learner activity data associated with the at least one learner; generate learner engagement data based upon the learner activity data associated with of the at least one learner, the learner engagement data being indicative of how engaged the learner is during the learning event; generate at least one learner engagement report based upon the learner engagement data; and provide the at least one learner engagement report to a computing device associated with an instructor.

In some cases, the processor is configured to provide the at least one learner engagement report to the instructor in real-time or near real-time such that the instructor is able to determine the current engagement level of the at least one learner from the learner engagement report.

In some cases, the at least one capture device includes a video capture device and the learner activity data includes video learner activity data.

In some cases, the at least one capture device includes a video capture device for capturing three-dimensional video data and the learner activity data includes three-dimensional video learner activity data.

In some cases, the at least one processor is configured to analyse at least one facial feature of the at least one learner to determine whether that learner is engaged, and generated the learner engagement data based upon that analysis.

In some cases, the at least one processor is configured to analyse at least one posture of the at least one learner to determine whether that learner is engaged, and generated the learner engagement data based upon that analysis.

In some cases, the at least one capture device includes an audio capture device and the learner activity data includes audio learner activity data.

In some cases, the at least one capture device includes at least one processor configured to capture learner input and the learner activity data includes learner input activity data.

In some cases, the at least one learner comprises a plurality of learners, and the processor is configured to generate the at least one learner engagement report based upon learner engagement date from the plurality of learners.

In some cases, the at least one learner comprises a plurality of learners who are located at different geographical locations.

In some cases, the at least one processor is configured generate at least one alert on at least one computing device being used to access the learning event to draw attention to the learning event.

In some cases, the at least one alert is generated automatically based upon the learner engagement data.

In some cases, the at least one alert is targeted to the at least one learner who is identified as being not engaged.

In some cases, the at least one alert is targeted to the at least one learner who is identified as being at risk of not being engaged.

In some cases, the at least one alert is targeted to the at least one learner selected by the instructor.

In some cases, wherein the at least one processor is further configured to determine learner comprehension of the at least one learner based upon at least one of the learner activity data and the learner engagement data.

In some cases, the at least one processor is further configured to provide learning materials to the at least one learner based upon the determined learner comprehension.

According to some other aspects there is provided a learning method. The learning method includes: monitoring activity of at least one learner during a learning event using the at least one capture device to generate learner activity data associated with the at least one learner; generating learner engagement data based upon the learner activity data associated with of the at least one learner, the learner engagement data being indicative of how engaged the learner is during the learning event; generating at least one learner engagement report based upon the learner engagement data; and providing the at least one learner engagement report to a computing device associated with an instructor.

BRIEF DESCRIPTION OF THE DRAWINGS

Various embodiments will now be described, by way of example only, with reference to the following drawings, in which.

Throughout the drawings, it should be noted that like reference numbers are used to depict the same or similar elements, features, and structures.

DETAILED DESCRIPTION

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Some embodiments described herein relate to systems and methods for monitoring activities of one or more learners, particularly learners engaged in eLearning.

In eLearning, an instructor may present learning material "live" in over a network to the learners. As an example, the instructor's presentation may be broadcast live over the network to the learners such that the learners may consume the presentation in real-time or in near real-time accounting for transmission delays. In some cases, the presentation may be recorded and each learner may consume the presentation at a later time.

In some cases, the learners may consume the presentation (live or pre-recorded) individually. For example, the learner may be located in his own home and be connected to a server over a network to receive and consume the presentation. In some cases, the presentation may be consumed by a group of learners at a single location. For example, a group of students may meet at a conference room or in a classroom to consume the presentation. In some cases, some of the learners may be in the same physical location as the instructor as he or she is delivering the presentation.

One challenge for the instructor is to determine how engaged the learners are to the presentation. For example, if the presentation is being delivered live to a number of learners, either in the same geographical location or at different physical locations, it would be useful for the instructor to obtain information associated with a degree to which the learners are engaged (e.g., during the presentation).

Even if the learners and the instructor are in the same room, it may still be still be useful for the instructor to obtain information associated with a degree to which the learners are engaged, for example in particular settings (e.g., large lecture halls) where it may be difficult for the instructor to personally monitor each of the learners in the room.

Having learner engagement information in real-time or near real-time may allow the instructor to make adjustments "on-the-fly" during the delivery of the presentation, thereby potentially increasing the effectiveness of the presentation.

Figure 1:
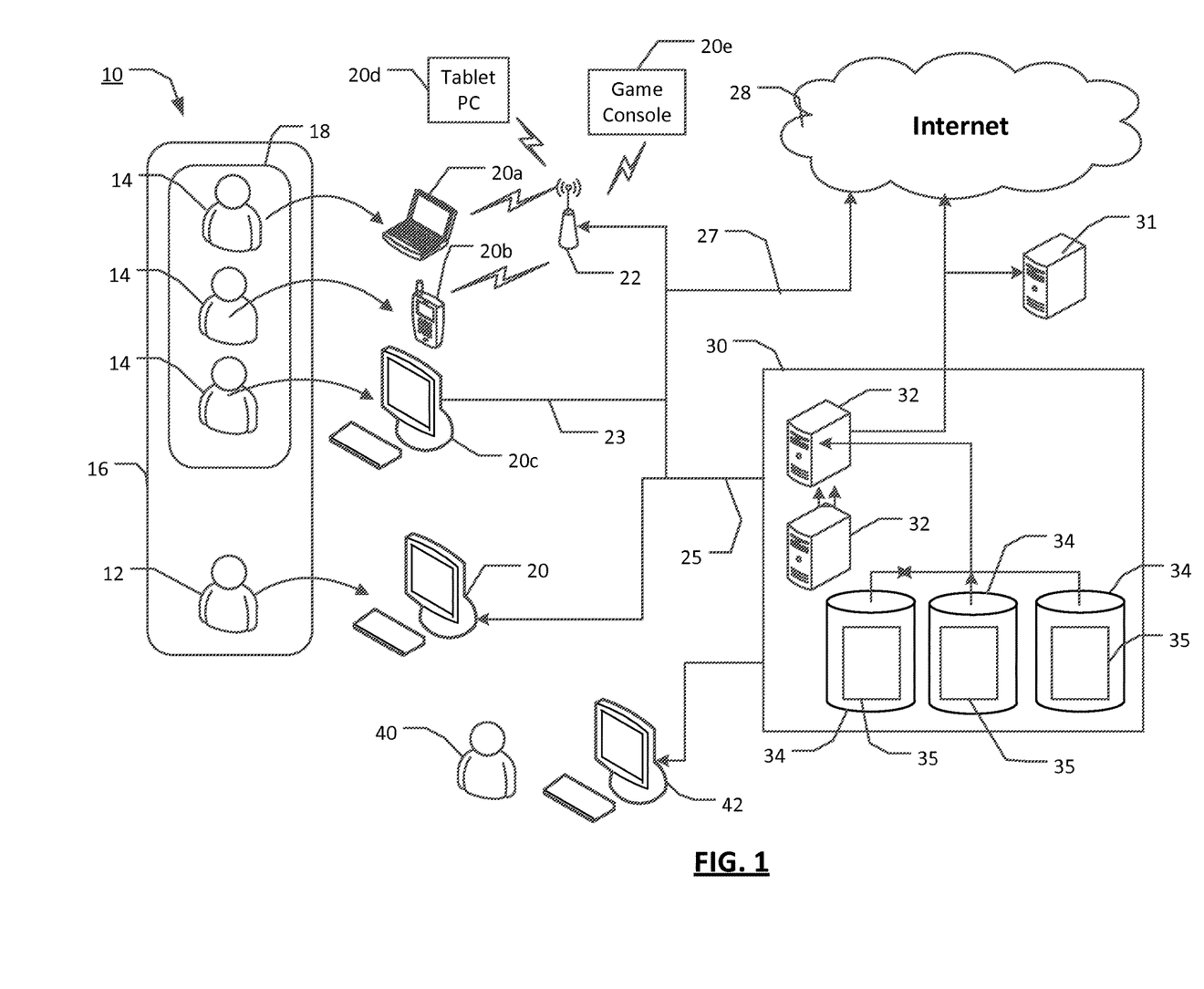
FIG. 1 is a schematic diagram of a learning system according to some embodiments.

Referring now to FIG. 1, illustrated therein is a system 10 for monitoring learner engagement according to some embodiments. The system 10 as shown is an electronic learning system or eLearning system. However, in other instances the system 10 may not be limited to electronic learning systems and the system 10 may be other types of systems.

Using the system 10, one or more users 12, 14 may communicate with an educational service provider 30 to participate in, create, and consume electronic learning services, including educational courses. In some cases, the educational service provider 30 may be part of (or associated with) a traditional "bricks and mortar" educational institution (e.g., a grade school, university, college, and the like), another entity that provides educational services (e.g., an online university, a company that specializes in offering training courses, an organization that has a training department, and the like), or may be an independent service provider (e.g., for providing individual electronic learning).

It should be understood that a course is not limited to courses offered by formal educational institutions. The course may include any form of learning instruction offered by an entity of any type. For example, the course may be a training seminar at a company for a group of employees or a professional certification program (e.g., PMP, CMA, and the like) with a number of intended participants.

In some embodiments, one or more educational groups can be defined that includes one or more of the users 12, 14. For example, as shown in FIG. 1, the users 12, 14 may be grouped together in an educational group 16 representative of a particular course (e.g., History 101, French 254), with a first user 12 or "instructor" being responsible for organizing and/or teaching the course (e.g., developing lectures, preparing assignments, creating educational content, and the like) and may be referred to as an instructor 12. The other users 14 or "learners" are consumers of the course content (e.g., users 14 are enrolled in the course) and may be referred to as learners 14.

The users 12, 14 may be associated with more than one educational group (e.g., the users 14 may be enrolled in more than one course, a user may be enrolled in one course and be responsible for teaching another course, a user may be responsible for teaching a plurality of courses, and so on).

In some cases, educational sub-groups may also be formed. For example, the learners 14 are shown as part of educational sub-group 18. The sub-group 18 may be formed in relation to a particular project or assignment (e.g., sub-group 18 may be a lab group, and the like) or based on other criteria. In some embodiments, due to the nature of the electronic learning, the learners 14 in a particular sub-group 18 need not physically meet, but may collaborate together using various tools provided by the educational service provider 30.

In some embodiments, other groups 16 and sub-groups 18 could include learners 14 that share common interests (e.g., interests in a particular sport), that participate in common activities (e.g., users that are members of a choir or a club), and/or have similar attributes (e.g., users that are male, users under twenty-one years of age, and the like).

The users 12 and 14 may interact with the system using various computing devices. The learners 14, for example, may use a laptop 20a, a tablet computer 20d, or a game console 20e, wirelessly coupled to an access point 22 (e.g. a wireless router, a cellular communications tower, etc.), a wirelessly enabled Personal Data Assistant (PDA) 20b or smart phone, a terminal 20c, operating over a wired connection 23. The instructor 12, for example, may use a terminal 20.

In some embodiments, the devices 20a-22e may have dedicated software installed therein to access the learning event. In other embodiments, the learners may access the learning event using a web-browser application through a web interface.

Figure 2:
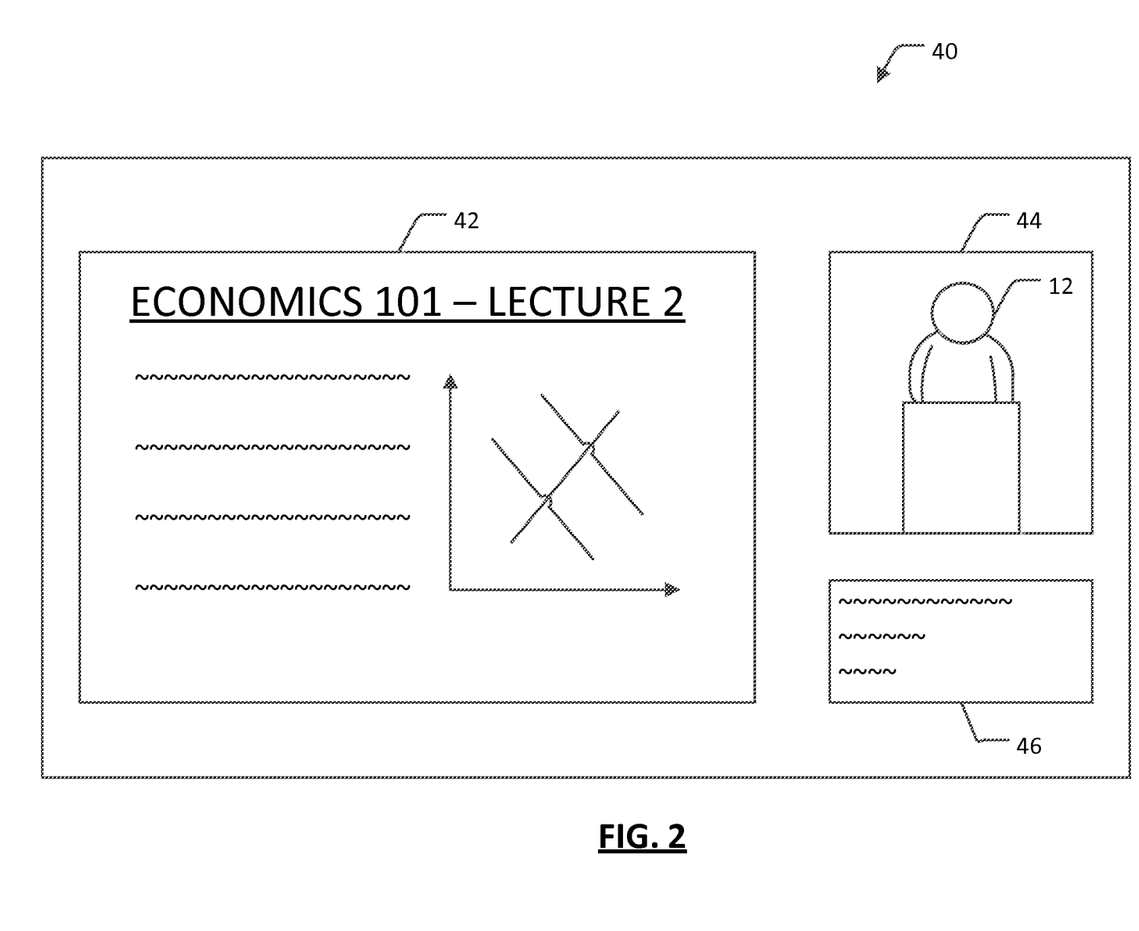
FIG. 2 is a schematic diagram of an interface that may be displayed to one or more uses on one or more computing device such as, for example, the computing devices shown in FIG. 1.

Referring now to FIG. 2, illustrated therein is an exemplary learner interface 40 which may be displayed on a display screen of the devices 20a-20e when the learner is accessing the learning event using one of the devices. The interface 40 includes a main presentation area 42, which in the example as shown is displaying a presentation slide from the lecture.

The interface 40 also has a display area 44, which is being used to show a video of the instructor presenting the learning event. The video may include pre-recorded video and/or a live-stream of the actual presentation that is being conducted in another location. In some cases, the information being displayed on the main presentation area 42 and the display area 44 may be switched such that the video of the instructor is being displayed in area 42 and the slides in area 44.

The interface 40 includes an activity area 46, which may be used by the learner to input questions or remarks for the instructor or other learners. The activity area 46 may also include questions and responses that have been previously provided by other learners or instructors.

Figure 3:
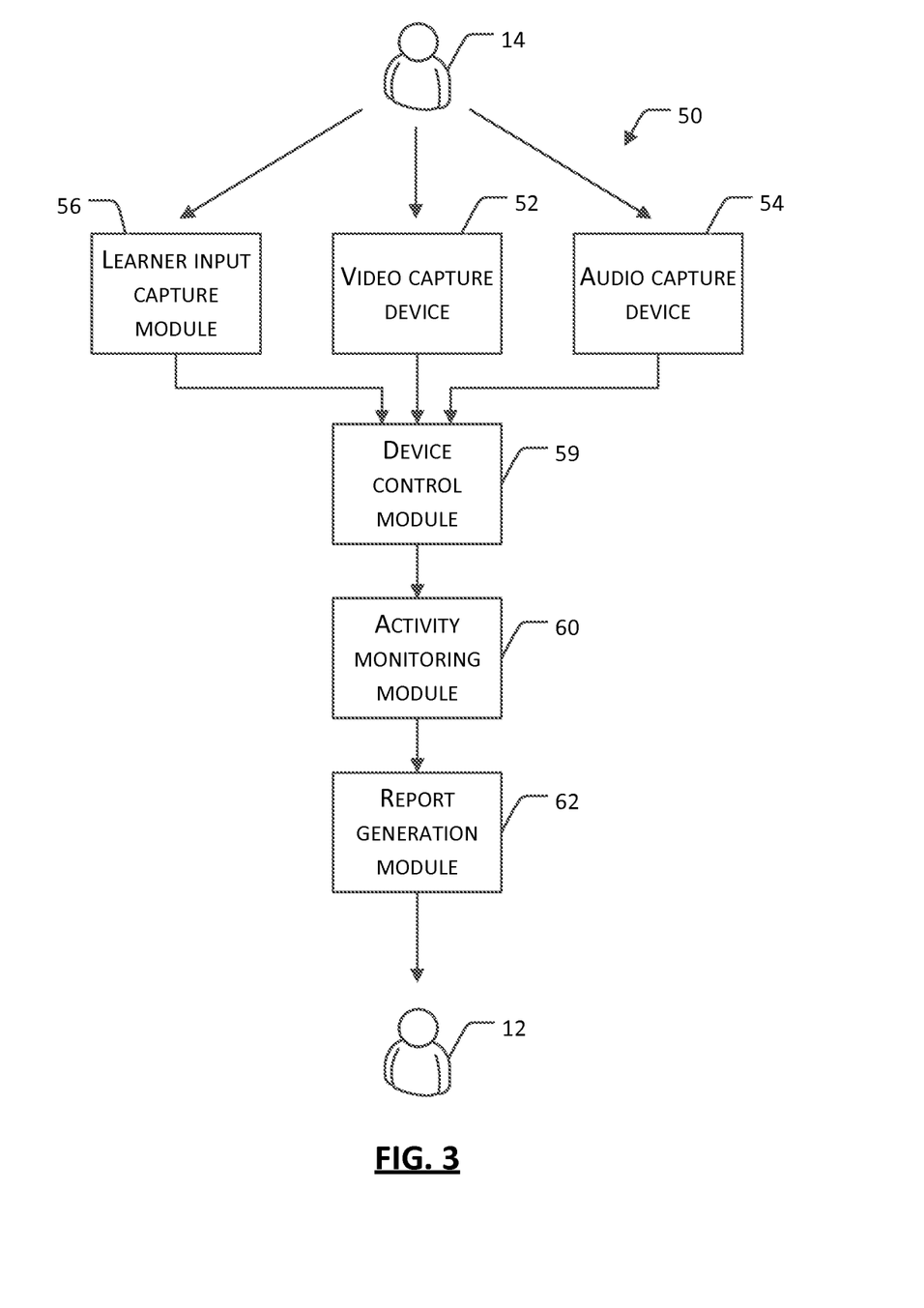
FIG. 3 is a schematic diagram illustrating exemplary modules provided by a learning system such as, for example, the system in FIG. 1.

Referring now to FIG. 3, illustrated therein are some components for monitoring activities of one or more learners according to some embodiments. The components may be provided by combination of one or more devices of the system 10.

As shown, a plurality of capture devices 50 for monitoring activity of one or more learners 14 are provided. Data from the capture devices 50 may be used to generate learner activity data about one or more learners 14 during a learning event.

A learning event may include any activity where information is presented to a learner. For example, a learning event may include activities where the instructor 12 presents information to a group of learners 14, such as a lecture, a seminar, or a presentation. The learning event may also include activities where the learners 14 are viewing pre-recorded presentations or lectures.

A single capture device 50 may be associated with a single learner 14 who is accessing the learning event remotely. If there are a number of learners 14 who are accessing the learning event as a group (e.g., a study group), a single capture device 50 may be associated with the group of learners. Alternatively, a single capture device 50 may be associated with a large group of learners 14 such as a group of learners 14 who are in a same physical location (e.g., a conference room or a lecture hall).

It may also be possible for a combination few capture devices 50 could be used to monitor a plurality of the learners. For example, there could be several capture devices positioned strategically in a large lecture room such that the devices could monitor all (or at least a substantial number) of the learners at that location.

The capture devices 50 may be integrated in one or more of the computing devices (e.g., devices 20a-20e) used by the learners 14. For example, the capture devices 50 may include a camera (e.g., a webcam) or a microphone integrated into a laptop, a tablet computer, a smart phone, and the like.

In some cases, the capture devices 50 may be external to the computing devices. For example, in cases where the computing devices used by the learners do not have integrated capture devices, an external device may be connected to the computing device, for example wirelessly or via a communication port (e.g., via a USB port). The capture devices 50 may also be installed in a room as part of a classroom infrastructure.

In some embodiments, the capture devices 50 may include a video capture device 52 for obtaining video learner activity data. The video capture device 52 may include a two-dimensional (2D) and/or three-dimensional (3D) camera.

The hardware for a 2D camera may include an optical sensor operable to capture images/videos of the learners within its operational field of view. The images/videos captured by the 2D camera will not normally include depth data. However, in some cases, depth data could be calculated or otherwise determined from the captured image data (e.g., for stereo or binocular vision images).

In contrast, a 3D camera may automatically capture depth data along with the image data.

In some cases, the 3D camera will includes one or more optical sensors. For example, the camera may include one or more depth sensors for generating depth data and a RGB sensor for generating image data (e.g., using a Bayer filter array). In some cases, the depth sensor could include an infrared laser projector and a monochrome CMOS sensor, which may capture video data in three-dimensions under ambient light conditions.

In some cases, the 3D camera may be configured to generate depth data and image data that are indicative of features within its operational field-of-view. For instance, if the learner is within the field-of-view of the camera, the depth data and the image data generated by the camera may include data indicative of activities of the operator.

The depth data, for example, may include information indicative of the activities of the learner relative to the camera and the background features. For example, the depth data may include information about the position of various body parts of the learner (i.e., hands).

The image data, generally, is indicative of the RGB data that is captured within the field-of-view of the camera. For example, the image data may be RGB data indicative of an amount of light captured at each pixel of the image sensor.

In some cases, the 3D camera may include hardware components (e.g., a processor and/or circuit logic) that correlate the depth data and the image data. For example, the hardware components may perform depth data and image data registration, such that the depth data for a specific pixel corresponds to image data for that pixel.

In some embodiments, some commercially available camera/sensor hardware may be used, such as the Kinect™ camera/sensor marketed by Microsoft Inc., or the Wavi™ Xtion™ marketed by ASUSTek Computer Inc.

In some embodiments, the capture devices 50 may include an audio capture device 54 configured to capture audio data. The audio capture device 54 may be a microphone and/or a directional microphone. The audio capture device 54, for example, may include one or more microphones found on various computing devices to facilitate VOIP or internet communication.

The capture devices 50 may include a learner input capture module 56 configured to capture each learner's interaction with the computing device during the learning event.

In some cases, the learner input capture device 56 may be an application resident on the computing device that capture's the learner's activity on the computing device. For example, the input capture device may capture data such as if the learner has responded to a question by interacting with the computing device, if the learner is taking notes, or whether the appropriate window for the learning event is in focus and/or is maximized on the computing device. In some examples, the learner input capture device 56 may capture keystrokes, mouse-clicks or any other relevant activity (or inactivity).

The learner activity data captured by various capture devices 50 is provided to an activity monitoring module 60. The activity monitoring module 60 is configured to receive the user activity data from various capture devices 50 and generate learner engagement data based upon the received learner activity data.

The learner engagement data is indicative of how engaged the learner is to the learning event. In some embodiments, the learner engagement data may also be indicative of a learner's comprehension of the learning event.

To generate the learner engagement data, the activity monitoring module 60 may be configured to determine how engaged a learner is from one or more aspects of captured learner activity data.

The activity monitoring module 60 may be configured to determine how engaged a learner is from video data indicative of various facial expressions of the learner. For example, the activity monitoring module 60 may be configured to detect whether the learner is looking at the learning event or looking elsewhere. If the learner is looking at the learning event, it may indicate that the learner is engaged. Alternatively, if the learner is not looking at the learning event, it may indicate that the learner is not engaged.

The module 60 may be configured to detect whether the learner has his/her eyes closed for an extended period of time, which may indicate that the learner is not paying attention to the learning event.

The module 60 may be configured to detect whether the learner is yawning, which may indicate that the learner is bored the learning event.

The module 60 may be configured to detect facial expressions or other facial features, such as whether the learner has furrowed his/her brows which may indicate that the learner is engaged but possibly confused.

The module 60 may be configured to detect if the learner's lips are moving. This may indicate that the learner is talking, which may mean that the learner is not engaged.

The module 60 may be configured to detect other facial expressions indicative of various emotions that the learner may be feeling, and determine how engaged the learner is based on those facial expressions.

The activity monitoring module 60 may be configured to determine how engaged a learner is from video data indicative of postures assumed by the learner.

For example, the module 60 may be configured to detect if the learner has his/her head tilted downwards for an extended period of time. This may indicate that the learner is "nodding-off" or dozing/sleeping and that the learner is not engaged.

The module 60 may be configured to detect if the learner is moving his/her head up and down. This may indicate that the learner is nodding and that the learner is engaged.

The module 60 may be configured to detect if the learner is present. For example, in remote learning situations, it is possible that the learner may not be present for the entire duration of the learning event. The module 60 may be configured to determine if the learner is present from the video data.

The module 60 may be configured to detect if the learner has one of his/her hand raised, which may indicate that the learner has something to say. In some cases, the learner may be raising his/her hand in response to a polling question by the instructor. The module 60 may be configured to detect if the learner raises one of his/her hand briefly, and put his/her hand back down, which may indicate that the learner has a question.

The module 60 may be configured to detect whether the learner is scratching his/or head, and or tilting their head sideways, which may indicate that the learner is confused.

The module 60 may be configured to detect other movements or learner postures, and determine how engaged the learner is based on that data.

The activity monitoring module 60 may be configured to determine how engaged a learner is from the captured audio data. For example, the activity monitoring module 60 may detect whether the learner is engaging in a conversation or listening to music, which may indicate that the learner is not engaged.

The activity monitoring module 60 may be configured to determine how engaged a learner is from the captured data from the learner input capture device 56.

For example, the module 60 may be configured to determine whether the learner is responding appropriately to questions presented during the learning event.

The module 60 may also be configured to determine from the captured data from device 56 whether the learner is interfacing with the computing device in a manner that suggests that the learner is not engaged. For example, the module 60 may monitor key presses to determine whether the learner is engaging in instant messaging, emails, and the like which would indicate that the learner is not engaged.

The activity monitoring module 60 may be configured to take into account expected activity level when evaluating captured data from various capture devices 50. For example, some movement from the learner's part would be expected as learners, regardless of whether they are engaged or not, do not remain perfectly stationary for extended period of times. Similarly, a yawn or two may be attributable to factors other than the learner not being engaged.

The activity monitoring module 60 may adjust the sensitivity of the analysis of the captured data based upon input from the instructor. For example, the activity monitoring module 60 may modify the expected activity level based upon the instructor input, which could affect the determination of whether the learners are being engaged.

The activity monitoring module 60 may be configured to analyse captured data from more than one capture device to determine whether the learner is engaged. For example, the video data related to posture and movement may be combined with the video data related to facial expressions to determine whether the learner is engaged. In another example, the video data may be combined with audio data and/or the learner input data to provide a more accurate determination of whether the learner is engaged or disengaged.

In some embodiments, the activity monitoring module 60 may generate a single overall learner engagement value for the associated learner based upon engagement/non-engagement data from various captured data sources. In such embodiments, appropriate weight may be assigned to type of data or analysis to obtain an overall learner engagement value that has a higher probability of being reflective of the engagement level of the student.

The learner engagement data for a plurality of learners are provided to the reporting module 62. The reporting module 62 aggregates learner engagement data associated with the learners and generates a class-wide report. The report allows the instructor to readily determine how engaged the students in his class room are.

Figure 4:
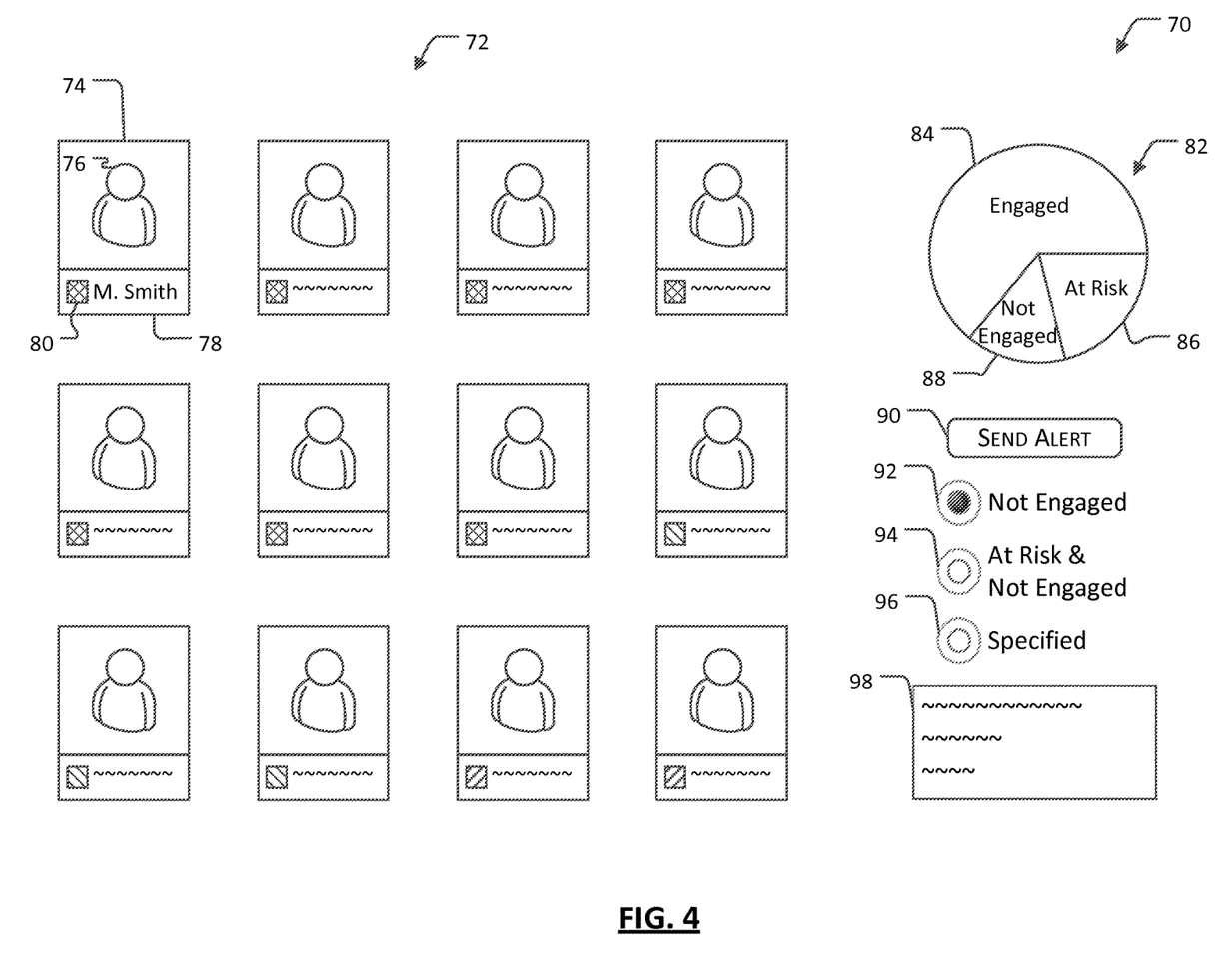
FIG. 4 is a schematic diagram illustrating a learner engagement report generated by a learning system such as, for example, the system shown in FIG. 1.

Referring now to FIG. 4, illustrated therein is a report 70 that may be generated by the reporting module 62 according to some embodiments.

The report 70 includes profiles 72 of the learners who are attending the learning event. An image of the learner may be displayed in the display area 76. In some cases, the display area 76 may display a video of the learner, for example from the video capture device of the computing device used by the learner. The video may be displayed in real time or near real-time (live) so that the instructor may view the learner even though the learner is located in a different geographical location.

The profiles 72 also include an information area 78, which may be used to display information about the learner in the display area 76 such as the learner's name. The display area 76 also displays a learner engagement indicator 80, which may be colour coded to convey to the instructor whether the learner is engaged (e.g., green), at the risk of not being engaged (e.g., amber), or not engaged (e.g., red).

The report 70 also includes a display 82 which indicates the overall engagement levels of various learners who are attending the learning event. The display 82, in the example as shown is a pie-chart. As shown, a portion 84 of the chart indicates the portion of the learners who are engaged, a portion 86 indicates the learners who are at risk of being not engaged, and a portion 88 of chart indicates learners who are not engaged. In other embodiments, additional information associated with the class may be displayed. For example, the chart may include learners who are identified as confused or learners who have questions.

The report 70 includes controls 90 to generate targeted alerts. As shown, the control 90 includes a button, which can be used to send alerts to a number of targeted learners. The targets may be selected using one of the options 92, 94, or 96. Selecting the option 92 would send alerts to learners who are identified as being not engaged. Selecting option 94 would send alerts to learners who are identified as being at the risk of not being engaged. The option 98 would send alerts to specified learners. The learners may be specified, for example, by using the profiles 72.

The report 70 also includes a dialog area 99. The dialog area 99, for example, may be used to receive any questions that the learners may have for the instructor.

In some embodiments, the reports such as the report 70 are provided in real-time or near real-time (to account for delays due to data processing and data transmission). For example, the instructor may assess how engaged the learners are currently from the report. This allows the instructors to take corrective action in a timely manner. For example, the instructors need not wait until at the end of the learning event to review and improve their work.

In some embodiments, the learner engagement data may be indicative of a comprehension level of the learners. For example, the learner engagement data may be indicative of how well the learners understood the material presented at the learning event. In some cases, remedial material may be provided to learners who are identified as not being engaged and/or not comprehending the learning event.

In some embodiments, the instructors are provided action options to respond to learner engagement status. For example, the instructor may be provided with one or more options to interact with the learners who are not engaged to increase their engagement level.

In some embodiments, the system 10 may be configured to provide targeted alerts, for example, to computing devices of learners who are not sufficiently engaged.

The alerts may include visual alerts such as shaking the screen, flashing the screen, and or other suitable visual alerts to attract the learner's attention back to the learning event.

The alerts may include audio alerts such as generating a sound or playing back a pre-recorded audio file to attract the learner's attention back to the learning event.

The alerts may include sending a query to the learners and expecting the learners to respond to the query to demonstrate that the learners are paying attention. The query may be provided in the form of a multiple choice question, true or false question, and any other suitable format.

It should be understood that it may not be necessary to provide the modules described above provide the functionalities described herein. In other embodiments, the system may be configured to provide the same or similar functionalities without the above noted modules.

As the system comprises more than one processor that is located at different geographic locations, various combinations of the processors in the system could be configured to provide the functionalities described herein. For example, various combinations of processors of one or more of the capture devices 50, the learner computing devices 20a-20d, server 32 and instructor computing device 20 may be configured to provide the functionalities of the activity monitoring module 60.

Figure 5:
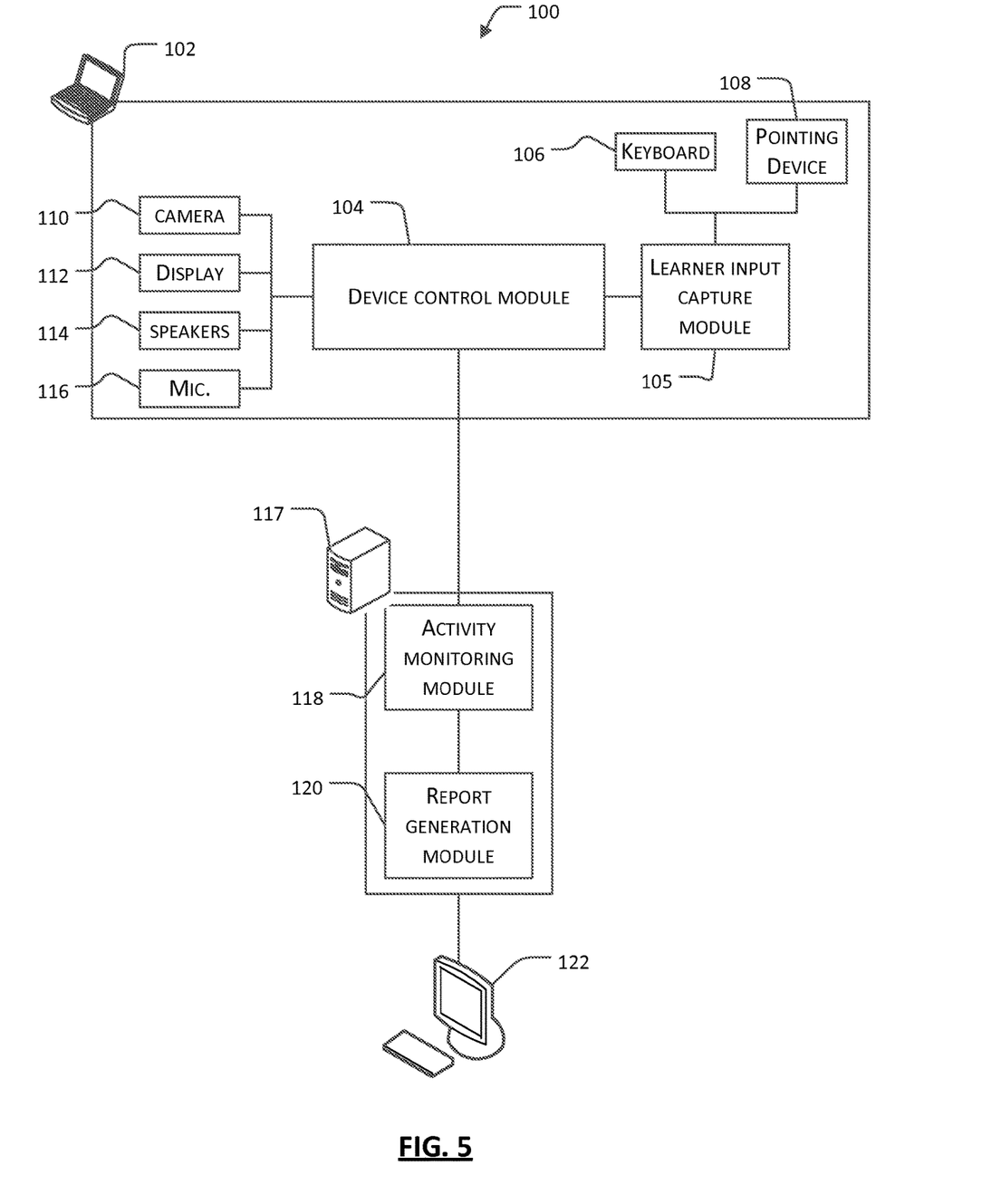
FIG. 5 is a schematic diagram illustrating one exemplary configuration of a module such as, for example, the modules shown in FIG. 3.

Referring now to FIG. 5, illustrated therein is one possible configuration 100 of the components of system 10 to implement the functionalities described above according to some embodiments.

The computing device 102 may be one of the computing devices 20a-20d used by one or more of the learners. The computing device 102 has installed therein a device control module 104. The device control module 104 is configured to control the operation of various input-output devices and capture devices connected to the computing device 102. The input devices in this example include a keyboard 106, a pointing device 108, speakers 110 and a display 112. The capture devices include a camera 114 and a microphone 116, The device control module 104 includes learner input control module 105, which may be similar to or the same as the learner input control module 56 described above.

The device control module 104 may be activated at the beginning of the learning event. Prior to activation, the device control module 104 may obtain the permission of the learner(s) using the computing device 102. Upon activation, the device control module 104 controls operation of the various connected input-output and capture devices. The device control module 104 may remain active for the duration of the learning event to facilitate various functionalities described herein.

The control module 104 may communicate with server 117 to provide user activity data captured from various capture devices and if requested, execute targeted alerts at the computing device 102.

The server 117 may be similar to or the same as the server 32 described herein above. The server 117 is configured to provide an activity monitoring module 118, which may be the same as or similar to the activity module 60 described herein above. In other embodiments, the activity monitoring module 118 may be provided by the computing device 102 and/or any other suitable device.

The activity monitoring module 118 is configured receive user activity data captured from various captured devices of the computing device 102. In some cases, the user activity data may be "raw" in that that the data has not been processed by one or more processors of the computing device 102. In other cases, the user activity data may be pre-processed, for example by the one or more processors in the computing device 102 or by integrated circuit associated with various hardware devices. For example, if a 3D camera is being used, the camera may have a built-in circuit/processor to extract the foreground from the background of the captured 3D visual data and/or to determine the change in the captured 3D visual data. In such cases, only selected data may be transmitted to the server 32, which may reduce the amount of data being transmitted.

The activity monitoring module 118 communicates learner engagement data to reporting module 120. The reporting module receives the learner engagement data associated with one or more learners and generate a learner engagement report. The reporting module 120 may be similar to the reporting module 62 described herein above.

The learner engagement report generated by the reporting module 62 is transmitted to the computing device 122 used by the instructor. The instructor may review the learner engagement report and if necessary, instruct the device control module to execute one or more targeted alerts.

Figure 6:
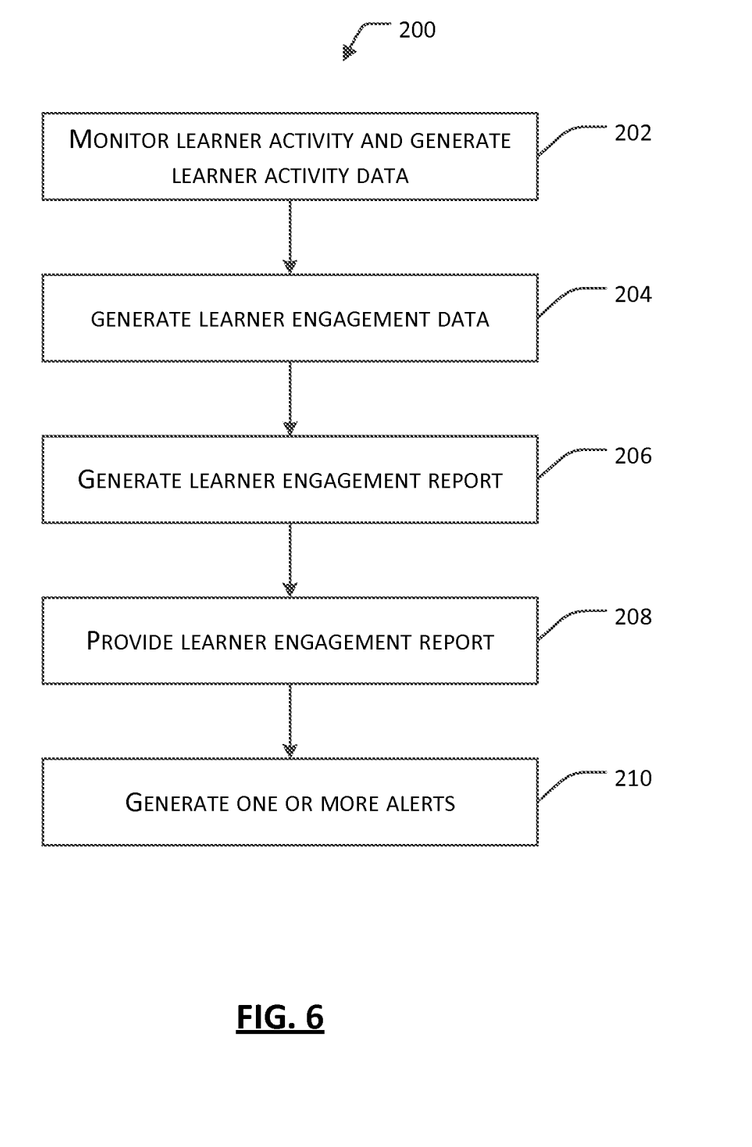
FIG. 6 is a schematic diagram illustrating a learning method according to some embodiments.

Referring now to FIG. 6, illustrated therein is a learning method 200 according to some embodiments. The method 200 may be executed by one or more processors of the system 10 shown in FIG. 1 and described herein above. The method 200 beings at step 202.

At step 202 activity of at least one learner during a learning event is monitored using the at least one capture device to generate learner activity data associated with the at least one learner.

At step 204, learner engagement data is generated based upon the learner activity data associated with of the at least one learner, the learner engagement data being indicative of how engaged the learner is during the learning event.

At step 206, at least one learner engagement report is generated based upon the learner engagement data.

At step 208, at least one learner engagement report is provided to a computing device associated with an instructor.

At step 210, at least one alert is generated on at least one computing device being used to access the learning event to draw attention to the learning event. In some embodiments, the step 210 may be executed automatically based upon the learner engagement data. In some embodiments, the step 210 may not be executed or omitted.

Figure 7:
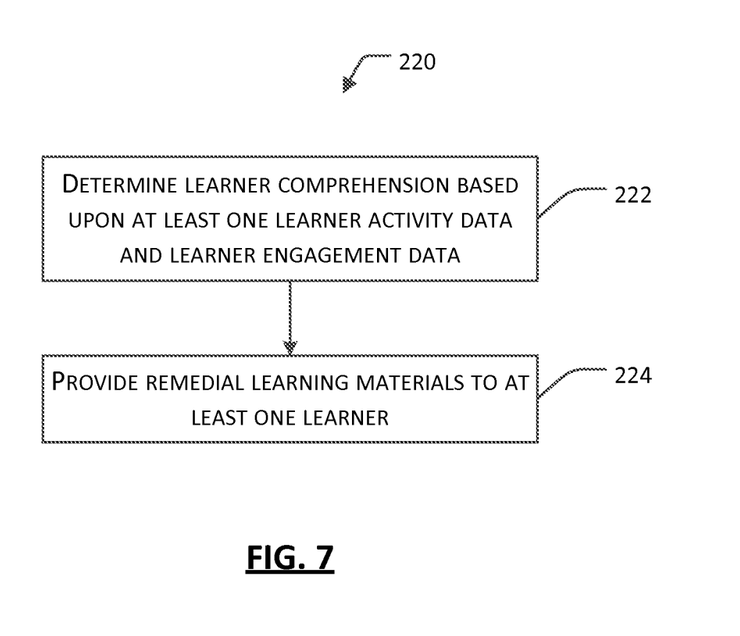
FIG. 7 is a schematic diagram illustrating a second learning method which may be executed in addition to the method shown in FIG. 6.

Referring now to FIG. 7, illustrating therein is a learning method 220. The steps of the learning method 220 may be executed by one or more processors of the system 10 in FIG. 1 and described herein above. The method 220 may be executed in addition to the method 200 to determine learner comprehension of at least one learner. The method 220 may help identify one or more learners who may not be comprehending material being presented at a learning event and provide remedial learning material to those learners. The method 220 begins at step 222.

At step 222, learner comprehension of at least one learner is determined based upon at least one of learner activity data and learner engagement data. The learner activity data and the learner engagement data may be generated in accordance with the method 200 or by the system 10 as described herein above.

At step 224, learning materials is provided to the at least one learner based upon the determine learner comprehension. The learner materials provided, for example, may include remedial learning material. In some embodiments, the learning material may be provided automatically without human input.

It should be understood that in other embodiments, one or more steps of the above described methods may be modified. In particular, one or more of the steps may be omitted, executed in a different order and/or in parallel, and there may be additional steps.

It should be understood that even though the embodiments are described herein in relation to electronic learning systems, they may be applicable in other fields of technology.

While the above description provides examples of one or more apparatus, methods, or systems, it will be appreciated that other apparatus, methods, or systems may be within the scope of the present description as interpreted by one of skill in the art. Moreover, the scope of the claims appended hereto should not be limited by the embodiments set forth in the examples, but should be given the broadest interpretation consistent with the description as a whole.

The invention claimed is:

1. A learning system comprising:
   a) at least one capture device that generates data corresponding to an activity of at least one learner, wherein the at least one capture device comprises an optical sensor that captures images or videos of the at least one learner within an operational field of view during a learning event;
   b) at least one processor configured to:
      i) extract features from images or videos captured by the at least one capture device, wherein the features are indicative of activities of the at least one learner relative to the capture device and wherein the features include depth data, background data and position data of body parts of the at least one learner;
      ii) generate learner engagement data and a learner engagement report based at least in part on the extracted features, the learner engagement report being indicative of how engaged the at least one learner is during the learning event, wherein the learner engagement data are based on detection of predetermined facial features, posture features, head features, hand features or a combination thereof of the at least one learner in the extracted features;
      iii) provide the learner engagement report to a computing device associated with an instructor, wherein the learner engagement report is provided to the computing device associated with the instructor contemporaneously with the capture by the optical sensor of the images or the videos of the at least one learner;
      iv) receive, from the instructor via an interface, an input corresponding to a request to send an alert to one or more of the at least one learner, wherein the one or more of the at least one learner is determined based at least in part on the learner engagement data; and
      v) in response to receiving the input corresponding to the request to send the alert to the one or more of the at least one learner, providing the alert to the one or more of the at least one learner, wherein the alert is targeted to increase an engagement of the one or more of the at least one learner with respect to the learning event, and wherein the alert is communicated contemporaneously with the learning event.

2. The system of claim 1, wherein the learner engagement report is provided to the instructor such that the instructor is able to determine the current engagement level of the at least one learner from the learner engagement report.

3. The system of claim 1, wherein the optical sensor is configured to capture three-dimensional video data and the at least one processor is configured to extract features including three-dimensional video learner activity data from the three-dimensional video data.

4. The system of claim 1, wherein the at least one processor is configured to analyse at least one facial feature of the at least one learner to determine whether that learner is engaged, and generate the learner engagement data based at least in part on the analysis of the at least one facial feature.

5. The system of claim 1, wherein the at least one processor is configured to analyse at least one posture of the at least one learner to determine whether that learner is engaged, and generate the learner engagement data based at least in part on the analysis of the at least one posture.

6. The system of claim 1, wherein the at least one capture device includes an audio capture device configured to capture audio data and the at least one processor is configured to extract features including audio learner activity data from the audio data.

7. The system of claim 1, wherein the at least one capture device includes at least one processor configured to capture learner input and extract features including learner input activity data from the learner input.

8. The system of claim 1, wherein the at least one learner comprises a plurality of learners, and the processor is configured to generate the learner engagement report based at least in part on the learner engagement data from the plurality of learners.

9. The system of claim 1, wherein the at least one processor is configured generate at least one alert on at least one computing device being used to access the learning event to draw attention to the learning event.

10. The system of claim 9, wherein the at least one alert is generated automatically based at least in part on the learner engagement data.

11. The system of claim 10, wherein the at least one alert is targeted to the at least one learner who is identified as being not engaged.

12. The system of claim 10, wherein the at least one alert is targeted to the at least one learner who is identified as being at risk of not being engaged.

13. The system of claim 10, wherein the at least one alert is targeted to the at least one learner selected by the instructor.

14. The system of claim 1, wherein the at least one processor is further configured to determine learner comprehension data of the at least one learner based at least in part on at least one of the extracted features and the learner engagement data.

15. The system of claim 14, wherein the at least one processor is further configured to provide learning materials to the at least one learner based at least in part on the determined learner comprehension data.

16. A learning method, the method comprising:
   a) extracting, using at least one processor, features from images or videos captured by an optical sensor of at least one capture device, wherein the features are indicative of activities of at least one learner within an operational field of relative to the capture device view during a learning event and wherein the features include depth data, background data and position data of body parts of the at least one learner;

b) generating, using at least one processor, learner engagement data and a learner engagement report based at least in part on the extracted features, the learner engagement data being indicative of how engaged the at least one learner is during the learning event, wherein the learner engagement data are based on detection of predetermined facial features, posture features, head features, hand features or a combination thereof of the at least one learner in the extracted features;

c) providing the learner engagement report to a computing device associated with an instructor, wherein the learner engagement report is provided to the computing device associated with the instructor contemporaneously with the capture by the optical sensor of the images of the videos of the at least one learner;

d) receiving, from the instructor via an interface, an input corresponding to a request to send an alert to one or more of the at least one learner, wherein the one or more of the at least one learner is determined based at least in part on the learner engagement data; and e) in response to receiving the input corresponding to the request to send the alert to the one or more of the at least one learner, providing the alert to the one or more of the at least one learner, wherein the alert is targeted to increase an engagement of the one or more of the at least one learner with respect to the learning event, and wherein the alert is communicated contemporaneously with the learning event.

17. The method of claim 16, wherein the learner engagement report is provided to the instructor such that the instructor is able to determine the current engagement level of the at least one learner from the learner engagement report.

18. The method of claim 1, wherein the learner engagement data is an aggregation of learner engagement data of a plurality of learners.

19. The method of claim 1, wherein the learner engagement report comprises an indicator that is displayed in one or more colors according to an engagement level of the at least one learner.

20. The method of claim 1, wherein the alert is a query sent to the at least one learner.

* * * * *